US00RE37455B1

(19) United States
(12) Reissued Patent
Müller et al.

(10) Patent Number: US RE37,455 E
(45) Date of Reissued Patent: Nov. 27, 2001

(54) AXIALLY COMPACT DIRECT DRIVE FOR STORAGE DISK HUB

(75) Inventors: Uwe Müller, Eisenbach; Michael Hermann, Villingen, both of (DE)

(73) Assignee: PAPST Licensing GmbH (DE)

(21) Appl. No.: 08/690,246

(22) Filed: Jul. 19, 1996

Related U.S. Patent Documents

Reissue of:
(64) Patent No.: 5,331,483
Issued: Jul. 19, 1994
Appl. No.: 07/907,516
Filed: Jul. 1, 1992

(30) Foreign Application Priority Data

Jul. 1, 1991 (DE) ..... 41 21 693

(51) Int. Cl.[7] ..... G11B 5/012
(52) U.S. Cl. ..... 360/86; 360/99.08; 369/269
(58) Field of Search ..... 360/86, 98.07, 360/99.04, 99.08; 369/266, 269, 270; 310/67 R, 90

(56) References Cited

U.S. PATENT DOCUMENTS

| | | | |
|---|---|---|---|
| 1,915,090 | 6/1933 | Hammond | 369/266 |
| 2,207,251 | 7/1940 | Guedon | 369/266 |
| 4,072,315 | 2/1978 | Tsujihara et al. | 369/266 |
| 4,072,874 | 2/1978 | Arnold, Jr. | 369/266 |
| 4,488,193 | 12/1984 | Davis et al. | 360/98.07 |
| 4,599,664 | 7/1986 | Schuh | 360/98.07 |
| 4,656,545 | 4/1987 | Kakuta | 360/98.07 |
| 4,658,312 | 4/1987 | Elsässer et al. | 360/99.08 |
| 4,887,175 | 12/1989 | Hoshi | 360/99.04 |
| 4,943,748 | 7/1990 | Shiozawa | 360/98.07 |
| 5,012,359 | 4/1991 | Kohno et al. | 360/99.04 |
| 5,013,947 | 5/1991 | Ide | 360/98.07 |
| 5,015,893 | 5/1991 | Shiozawa | 360/98.07 |
| 5,045,738 | 9/1991 | Hishida et al. | 369/269 |
| 5,079,656 | 1/1992 | Hoshi | 360/99.04 |
| 5,193,084 | 3/1993 | Christiaens | 369/270 |
| 5,200,866 | 4/1993 | Frugé et al. | 360/98.07 |

FOREIGN PATENT DOCUMENTS

| | | |
|---|---|---|
| 3538480 | 10/1985 | (DE) . |
| 0 392 500 | 4/1990 | (EP) . |
| 62-73458 | 4/1987 | (JP) . |

*Primary Examiner*—Charles G. Freay
(74) *Attorney, Agent, or Firm*—Finnegan, Henderson, Farabow, Garrett & Dunner, L.L.P.

(57) ABSTRACT

An axial compact direct drive for a storage disk comprises a stator, a rotor carrying a hub for receiving storage disks and a bearing arrangement. The bearing arrangement is disposed at a radially external edge of the hub to rotatably support the hub against axial and radial movement. The rotor is electrically driven at locations in the center of the stator or at locations surrounding the stator.

15 Claims, 5 Drawing Sheets

*(AMENDED)*

FIG. 1
(AMENDED)
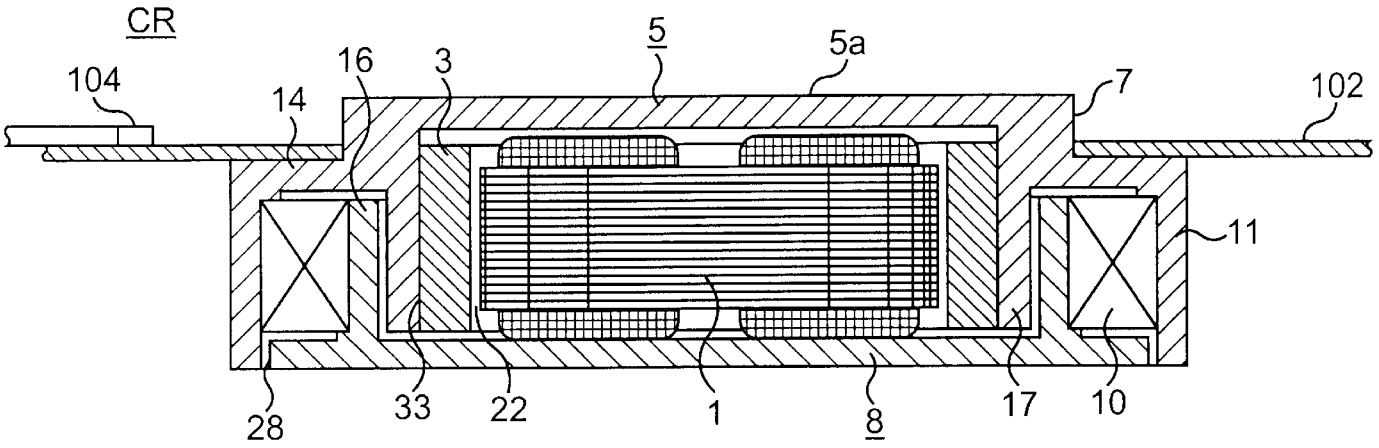
FIG. 2
(AMENDED)
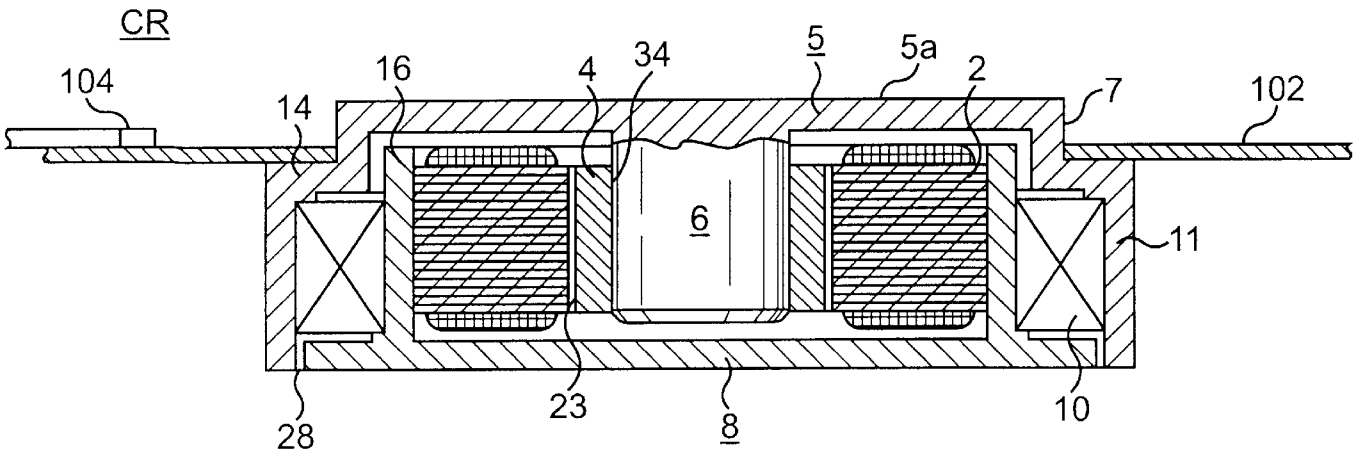

FIG. 3
(AMENDED)
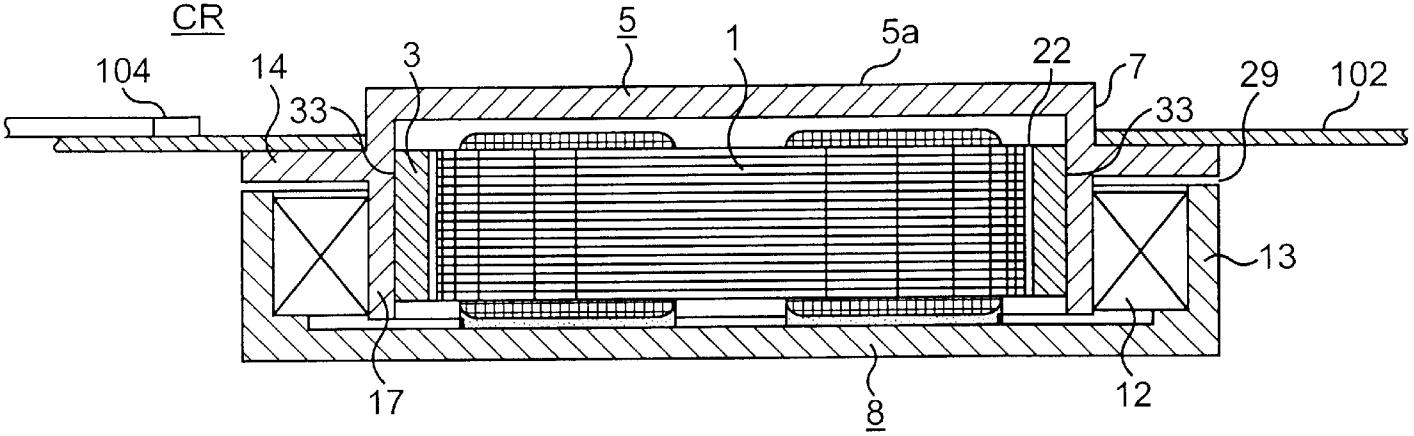
FIG. 4
(AMENDED)
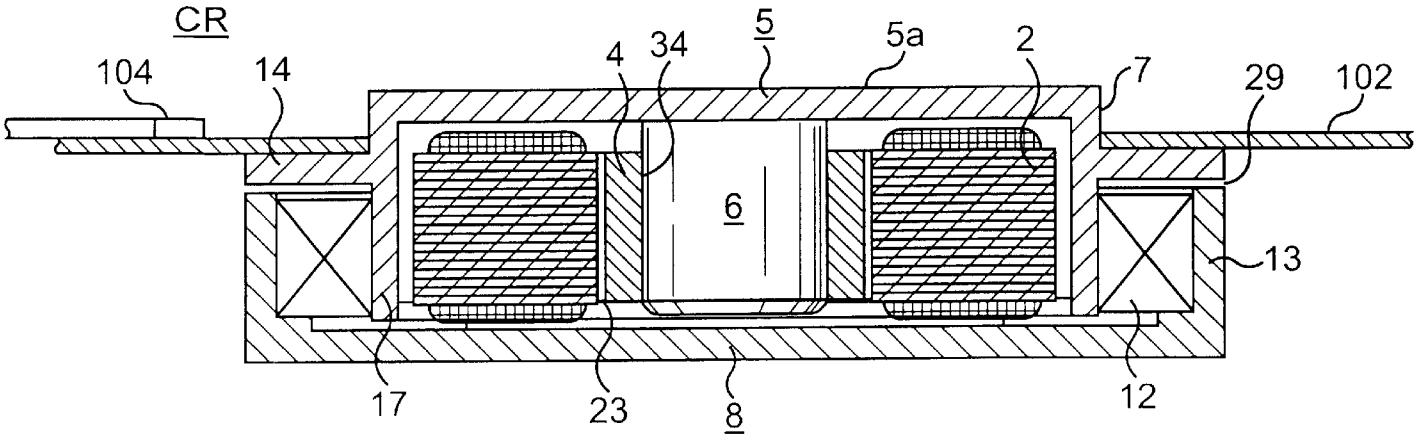

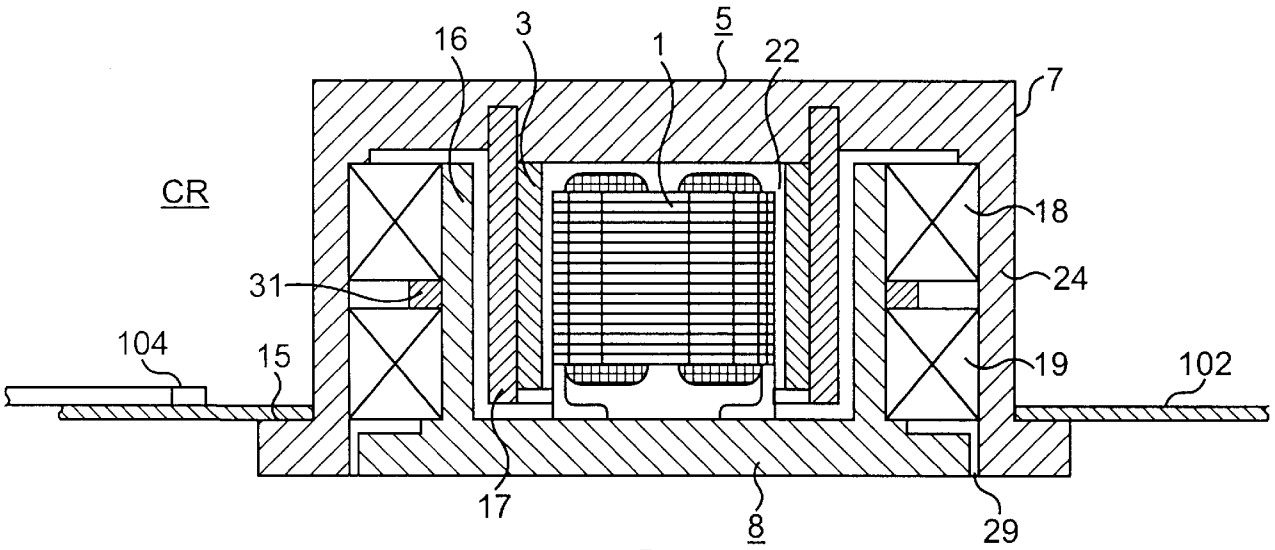
FIG. 5
(AMENDED)
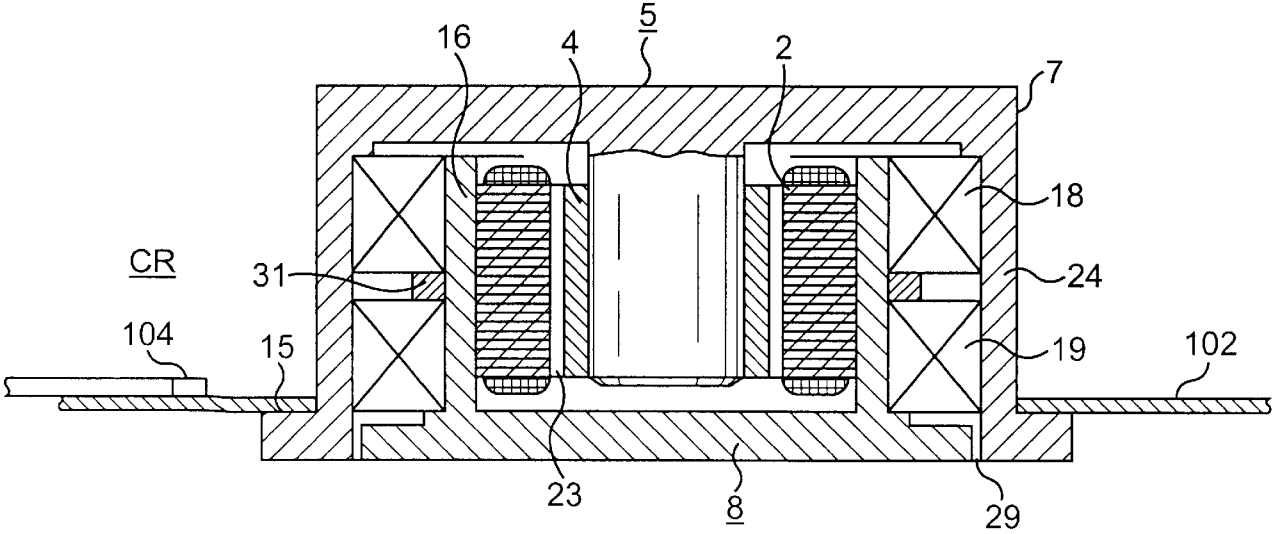
FIG. 6
(AMENDED)

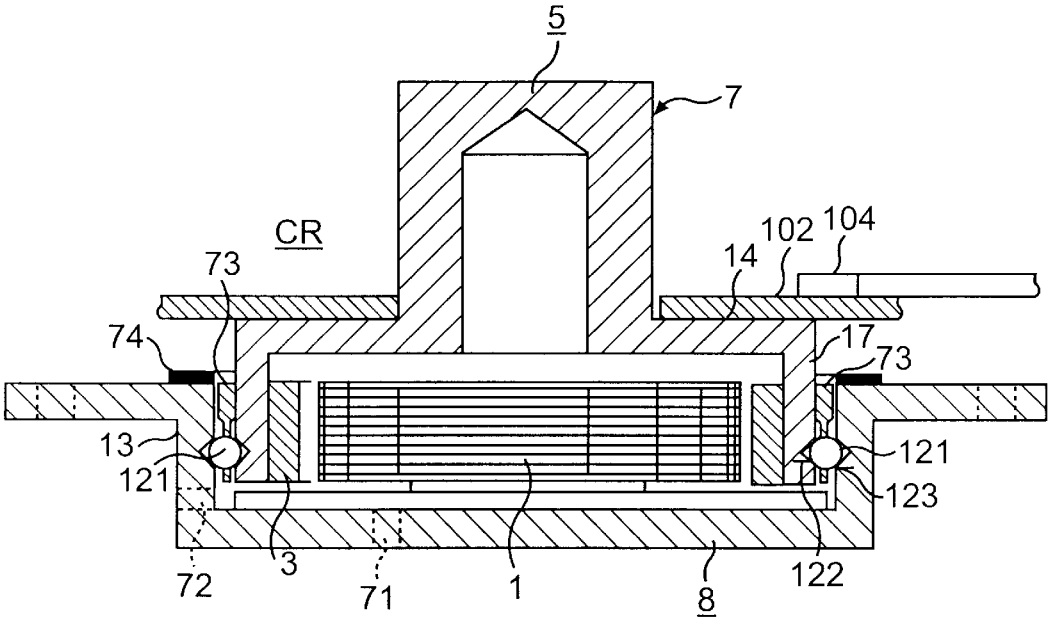
FIG. 7
(AMENDED)

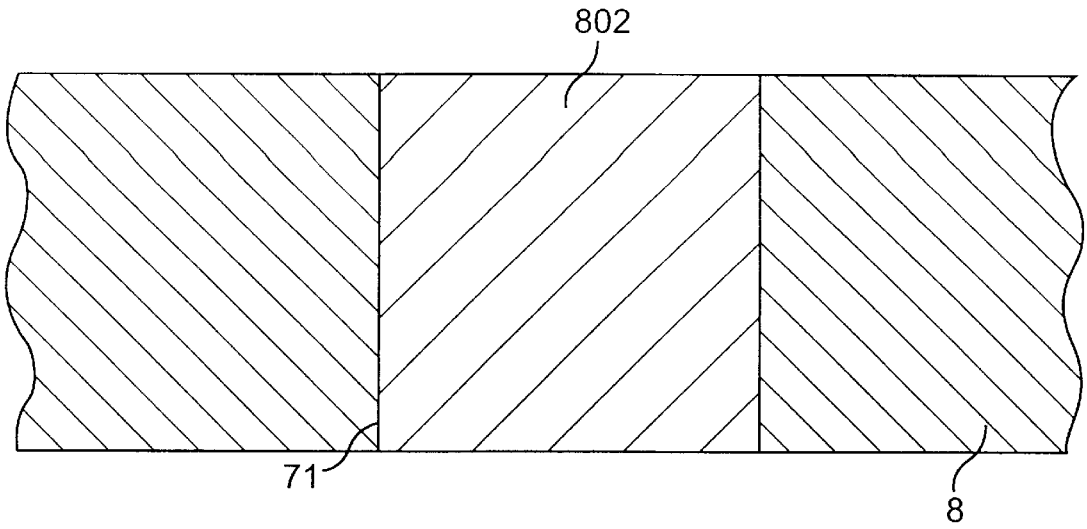
FIG. 8
(NEW)
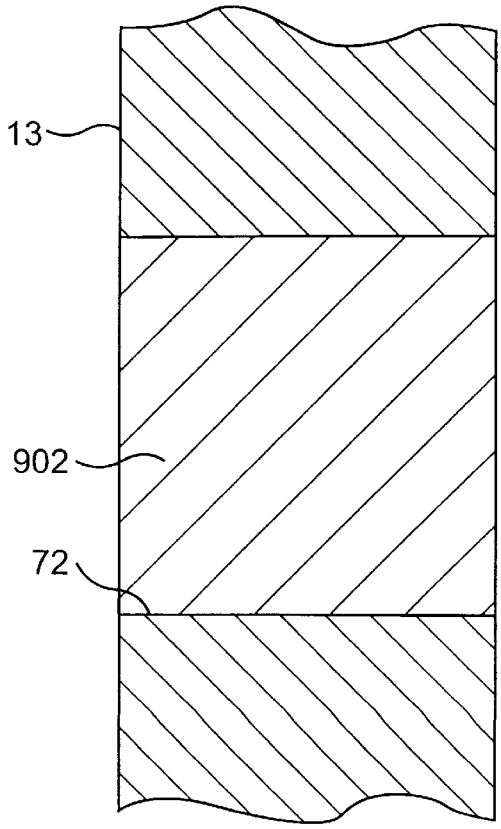
FIG. 9
(NEW)

AXIALLY COMPACT DIRECT DRIVE FOR STORAGE DISK HUB

Matter enclosed in heavy brackets [ ] appears in the original patent but forms no part of this reissue specification; matter printed in italics indicates the additions made by reissue.

BACKGROUND OF THE INVENTION

The application relates to a storage disk direct drive including a motor and a bearing arrangement for rotatably supporting a hub that carries storage disks. In arrangements of this kind, as a result of the extreme accuracy required as a result of the increasingly small size of the storage disks of 2.5 to 1.8 or even 1.3 inches in diameter (1 inch=25.4 mm), it is difficult to observe the extreme tolerances and to meet the specific quality requirements which must be achieved in these motors. These requirements of errors relate to non-repeatable run out or NRR. In addition, the influence of temperature deviations must be compensated for. Furthermore, a specific load-carrying capacity must be guaranteed for the bearing arrangement and certain resonance frequencies must be avoided.

Therefore, the object of the invention is to design a massproducible subminiature motor by means of which the abovementioned properties are additionally obtained.

BRIEF DESCRIPTION OF THE DRAWINGS

The invention will now be described in more detail, by way of example, with reference to the drawings, in which FIG. 1 is a diagrammatical longitudinal sectional view of an external rotor variant.

FIG. 2 is a diagrammatical longitudinal sectional view of an internal rotor alternative variant.

FIG. 3 is a diagrammatical longitudinal sectional view of an external rotor variant.

FIG. 4 is a diagrammatical longitudinal sectional view of an internal rotor alternative variant.

FIG. 5 is a diagrammatical longitudinal sectional view of an external rotor variant.

FIG. 6 is a diagrammatical longitudinal sectional view of an internal rotor alternative variant.

FIG. 7 is a further embodiment showing a diagrammatical longitudinal sectional view showing the use of an integrated ball bearing.

*FIGS. 8 and 9 are a diagrammatical view of filters to be used with the embodiment of FIG. 7.*

DESCRIPTION OF THE PREFERRED EMBODIMENTS

FIGS. 1, 3 and 5 show what are referred to as external rotor variants, in which therefore an internal stator 1 with a cylindrical external circumference is rigidly fixed to a base plate 8, and a permanent magnetic ring 3 is rotatable about the cylindrical external circumference of the internal stator 1. The magnetic ring, with or without a separate hollow cylindrical magnetic return ring 11, forms the electromotive drive element in the external rotor, which is in the shape of a cup or a bell and into which this permanent magnetic rings is inserted.

FIGS. 2, 4 and 6 show as an alternative what are referred to as internal rotor solutions, in which a rotor shaft 6 directly carries a permanent magnetic rotor ring (if necessary, also with the interposition of a soft magnetic, hollow cylindrical return ring), the external circumference of which rotates in the interior of a hollow annular stator iron core which is in turn rigidly connected to a base plate 8.

The rotor may advantageously comprise hollow cylindrical permanent magnetic rotor magnets (3, 4) having an additional soft magnetic return ring on the surface (33, 34) at the rear side of an air gap between the rotor and the stator.

The common factor in all of the embodiments shown is that the rotating bell or the rotating cup simultaneously forms the disk storage hub and embraces the entire motor radially at its external circumference in such a manner that the drive's bearing arrangement is provided in the external edge region of the rotor, i.e. outside the direct driving motor.

All of the figures are longitudinal sections through the imaginary axis extending from top to bottom in the center of the figures.

In all of the figures, the reference numeral 1 designates an internal stator which is supported from below on the base plate 8 acting as a bearing plate. The same thing applies to the reference numeral 2, which designates a hollow annular external stator which is also supported directly or indirectly on the plate 8 or is fixedly connected thereto.

The reference numeral 3 designates the annularly arranged external rotor permanent magnets which engage projecting ring parts 17 which are secured to a storage disk hub 5 or are preferably formed in one piece therewith. The reference numeral 3 designates the internal permanent magnetic rotor ring which preferably rotates fixedly connected to a central shaft 6 which passes over into the storage disk hub 5, expanding radially to a considerable extent in the hub region.

The reference numeral 7 designates a very precise cylindrical locating surface for the storage disks. The very precise locating surface 7, stepped together with a central disc 5a and a radially projecting annular disk 14 (FIGS. 1–4) and 15 (FIGS. 5 and 6), form the actual hub element and. As seen in FIGS. 1 and 2, a hollow cylindrical projection, forming the magnetic return ring 11, is integrally cast with these stepped radially projecting annular disks 14, 15, at the radially outermost end, so that this hollow magnetic return ring 11, together with the annular disc 14 of the location surface 7 and the central flange or disk 5a, defines the bell or cup shape and, moreover, this magnetic return ring 11 is rigidly connected to the outer raceway of a bearing 10, as shown in FIGS. 1 and 2, while the inner raceway the bearing 10 is supported on a ring part 16 projecting axially rigidly from the plate 8. The ring parts 16, 17, the bearing 10 and the hollow cylindrical projection 11 are nested axially into one another so that they are all situated radially concentrically in respect to one another.

Whereas in the embodiment according to FIG. 2, the [internal stator 1] *external stator 2* is supported on the upwardly projecting ring 16, in the embodiment according to FIG. 4, the internal stator 1 is directly connected, e.g. sealed or glued, to the base plate 8. An outer ring 13, which, in the case of the embodiment according to FIG. 4, projects upwardly from the plate 8 and is connected in one piece therewith, is designed to rotate in the embodiment according to FIG. 2, the hollow cylinder 11, as also shown in FIGS. 1 and 2, being formed by the rotating hub. This means that in the case of the embodiment according to FIGS. 1 and 2, the outer raceways of the bearings 10 are inserted into the cup-shaped hub and rotate therewith, whereas, in the case of the embodiments of FIGS. 3 and 4, the inner raceways of these external bearings 12 rotate with the pulled-down ring wall 17. In the case of the external rotor motors according to FIGS. 1, 3 and 5, the air gap is designated by the reference numeral 22, and in FIGS. 2, 4 and 6 for the internal rotor variants, the air gap is designated by the reference numeral 23. In FIGS. 1, 3 and 5, the pulled-down ring parts 17 carry the hollow cylindrical permanent magnetic ring 3 of large diameter which allows for a relatively large air gap surface, so that the magnetic flux passing through the air gap does not need to have an extremely high density as in the case of the embodiments of FIGS. 2, 4 and 6, this allowing the latter to be produced from a less expensive material. In an analogous manner, in the embodiments according to FIGS. 2, 4 and 6, permanent magnetic rings 4, 6 or ring segments are supported on the preferably ferromagnetic rotor shaft 6. The shaft 6, together with the ring or the ring parts 4, thus forms the internal rotor.

The magnetic storage disks are not only situated on the highly precise cylindrical outer surface 7, but also lie on the radially projecting shoulders 14 (FIGS. 1–4), 15 (FIGS. 5 and 6). These shoulders 14, 15 partly cover the bearings 10 and 12, particularly in the case of the embodiments according to FIGS. 3 and 4, so that it is also possible with respect to the design to provide labyrinth sealing elements at the gaps 28, 29. *As shown in FIGS. 1–7, hub 5, a magnetic hard data storage disk 102, and a read head 104 are positioned in a clean chamber or clean room CR, sealed from elements, as readily apparent to those of ordinary skill in the art.* FIGS. 5 and 6 show an arrangement of long axial design intended to drive a plurality of disks. In these embodiments, the cylindrical surface 7 is of longer design. Two bearings 18, 19 inserted axially on top of one another into the external rotor bell 5, 24 are provided, separated by a spacer ring 31 on the stator side. In both embodiments according to FIGS. 5 and 6, the outer raceways of the bearings 18, 19 carry the hollow cylindrical wall 24 of the storage disk hub which is pulled down flush with the shoulder 15 reaching as far as the plate 8. In the embodiments of FIGS. 1, 3 and 5, the central disk 5 which forms the [centre] *center* of the hub is, so to speak, shaftless, whereas, in the embodiments of FIGS. 2, 4 and 6, this disc passes over into the central shaft 6 which rotates.

In the case of the embodiments according to FIGS. 1, 3 and 5, the internal stator can also be supported via what is referred to as a vertical shaft, although the bearing means then do not engage this vertical shaft.

In all of the embodiments of the invention (see all of FIGS. 1 to 6) it is essential that the elements for the bearing arrangement 10, 12, 18 and 19 are situated radially outside the actual motor, i.e. that they surround the latter. The driving motor is then almost inserted into the bearing arrangement.

In view of the criteria mentioned at the outset, this new concept according to the invention has proven to be advantageous in these special motors for a high load-carrying capacity and for good preloading, and also for noise generation and also quiet physical running. These bearing arrangements of relatively large radial design according to the invention also have a larger ball number, this also being advantageous for the required properties.

A further embodiment according to FIG. 7 (page 4/4 of the drawings) shows another arrangement of the invention also of long axial design. In comparison to the previous arrangements, this is [characterised] *characterized* in that an integrated ball bearing is provided instead of a conventional ball bearing 12. This consists of balls 121, an inner raceway 122, an outer raceway 123 and a ball cage device 73. The races preferably have adjacent surfaces in the shape of a truncated cone and are precision turned or ground. The ball cage device 73 is placed on the rotor part 17. It has finger-like projections, preferably of a plastic material, which separate the balls of the bearing at a suitable spacing. As a result of its dimensions, the ball cage device serves simultaneously as a sealing element in order to keep abraded particles from the region of the bearing arrangement away from the region of the data storage or the magnetic disks, *i.e., clean chamber CR*. This function is supported by an optionally provided sealing plate 74. A ventilation device is provided as a further additional measure against contamination of the data storage region, *i.e., clean chamber CR*. This consists of an inlet opening 71 with an integrated filter [(not shown)] *802* of cellulose or foam material, and an outlet opening 72 which is also situated in the stator part 13 and is also provided with an integrated filter [(not shown)] *902. Integrated filter 802 and integrated filter 902 are shown in FIG. 8 and FIG. 9, respectively.* A negative pressure is produced at the inlet opening 71 by the rotational movement of the rotor part/hub 5, so that air is drawn in at this point. On the other hand, excess pressure is produced at the opening 72, so that the air drawn in at this point escapes and any abraded particles produced are preferably discharged at this point. It will be understood that the arrangement is assembled in the conventional manner, i.e. the rotor part/hub 5 is displaced out of its coaxial position, after which the ball bearing balls are inserted on one side. The rotor part/hub 5 is then returned to its coaxial set position, the balls are distributed by rotation and finally the ball cage device is mounted. According to the invention, the stator 1 is advantageously inserted into and fixed to the arrangement subsequently in order to maintain small air gaps between the stator and the magnet 3.

We claim:

[1. A storage disk drive, especially for a hard storage disk, comprising a stator, a rotor, a bearing arrangement (10, 12; 18, 19) and a coaxial hub (5, 7) having a radially external edge, to the outer surface of which one or more hard disks are secured, characterised in that the bearing arrangement rotatably supports the hub (5, 7) exclusively in the region of the radially external edge of the hub.]

[2. A storage disk drive according to claim 1, characterised in that the bearing arrangement radially surrounds, the stator and the rotor.]

[3. A storage disk drive according to claim 1 or claim 2, characterised in that the hub (5, 7) is substantially cup-shaped, and that an outer race of at least one ball bearing (10, 18, 19) is secured to a cylindrical inner wall (11, 24) of the hub (5).]

[4. A storage disk drive according to claim 1 or claim 2, characterised in that an outer surface (7) of the hub (5) passes over radially into a flange-like outwardly projecting support (14), an inner ring of at least one ball bearing (12) being arranged on a hollow cylindrical ring part (17) on the other axial side of the hub.]

[5. A storage disk drive according to claim 1 or claim 2, characterised in that the rotor, stator, hub and bearing arrangement are concentric and engaged radially with one another.]

[6. A storage disk drive according to claim 1 or claim 2, characterised in that the bearing arrangement comprises at least one roller bearing (10, 12).]

[7. A storage disk drive according to claim 1 or claim 2, characterised in that the rotor comprises hollow cylindrical permanent magnetic rotor magnets (3, 4) having an additional soft magnetic return ring on the surface (33, 34) at the rear side of an air gap between the rotor and the stator.]

[8. A storage disk drive according to claim 1 or claim 2, characterised in that the rotor comprises hollow cylindrical permanent magnetic rotor magnets (3, 4) having a soft magnetic return ring formed by a hollow cylindrical ring part 17 consisting of a ferromagnetic material on the surface (33, 34) at the rear side of an air gap between the rotor and the stator.]

[9. A storage disk drive according to claim 8, characterised in that the hollow cylindrical ring part 17 is integrally moulded with the hub (5).]

[10. A storage disk drive according to claim 8, characterised in that the hollow cylindrical ring part 17 is coaxially connected to the hub (5) as a separate component.]

[11. A storage disk drive according to claim 1 or claim 2, characterised in that the bearing arrangement comprises an integrated ball bearing comprising an in-wrought ball race (122) on the rotor side.]

[12. A storage disk drive according to claim 1 or claim 2, wherein said bearing arrangement comprises a ball cage device (73) which serves simultaneously as a sealing element.]

[13. A storage disk drive according to any one of the preceding claims, characterised in that a ventilation device is provided, consisting of an inlet opening (71) and an outlet opening (72), the openings (71) and (72) being provided with filter inserts.]

[14. A storage disk drive according to any one of the preceding claims, characterised in that an exchangeable stator part (1) is provided for subsequent mounting in the storage disk drive.]

[15. A storage disk drive, especially for a hard storage disk, comprising a stator, a rotor, a bearing arrangement (10, 12; 18, 19) and a coaxial hub (5, 7) having a radially external edge, to the outer surface of which one or more hard disks are secured, characterised in that the bearing arrangement comprises a bearing disposed in the region of the radially external edge of the hub which rotatably supports the hub against axial and radial movement.]

*16. A disk storage device comprising:*

*a clean room;*

*at least one data storage disk;*

*a data read head for movement in operative relation to the disk within the clean room;*

*a rotatable disk mounting element forming a hub for supporting said storage disk in said clean room, said disk mounting element having a radially external edge;*

*a permanent magnetic ring affixed to said rotatable disk mounting element, said ring having an outer diameter of a first dimension;*

*a stator positioned within said permanent magnetic ring and separated therefrom by a substantially cylindrical air gap, said stator producing magnetic flux interacting with said permanent magnetic ring to rotate said rotatable disk mounting element and said data storage disk;*

*a base plate defining a portion of the clean room, said base plate including a bearing support element defining a circular bearing path having a diameter greater than said first dimension; and*

*bearing means engaging said bearing support element and said rotatable disk mounting element for rotatably supporting the disk mounting element on said base plate exclusively in the region of the radially external edge of said disk mounting element.*

*17. A disk storage device comprising:*

*a clean room defined in part by a base plate;*

*at least one hard storage disk;*

*a data read head for movement in operative relation to the disk within the clean room;*

*a stator;*

*a cylindrical rotor member having an outer diameter of first dimension;*

*a coaxial hub having a radially external edge, to the outer surface of which said hard disk is secured; and*

*a bearing arrangement mounted on said base plate including bearing elements rotatably supporting said coaxial hub exclusively in the region of the radially external edge of said coaxial hub, said bearing elements being restrained to follow a circular bearing path having a diameter greater than said first dimension.*

*18. A disk storage device comprising:*

*a clean room defined in part by a base plate;*

*at least one data storage disk;*

*a data read head for movement in operative relation to the disk within the clean room;*

*a rotatable disk mounting element forming a hub for supporting said storage disk in said clean room, said disk mounting element having a radially external edge;*

*a cylindrical bearing support member mounted on said base plate;*

*at least one bearing mounted on the outer surface of said bearing support member and engaging said disk mounting element for supporting the disk mounting element exclusively in the region of the radially external edge for rotation in the clean room; and*

*a motor coupled to said disk mounting element for rotating said disk mounting element and said storage disk, said motor including stator and magnetic rotor elements mounted within said bearing support member.*

*19. A disk storage device comprising:*

*a clean room defined in part by a base plate;*

*at least one data storage disk;*

*a data read head for movement in operative relation to the disk within the clean room;*

*a rotatable disk mounting element forming a hub for supporting said storage disk in said clean room, said rotatable disk mounting element having a radially external edge;*

*a cylindrical bearing support member affixed to said rotatable disk mounting element;*

*at least one bearing mounted on the outer surface of said bearing support member and engaging said base plate for supporting said disk mounting element exclusively in the region of the radially external edge for rotation in the clean room; and*

*a motor coupled to said disk mounting element for rotating said disk mounting element and said storage disk, said motor including stator and magnetic rotor elements mounted within said bearing support member.*

*20. A disk storage device comprising:*

*a clean room defined in part by a base plate;*

*at least one data storage disk;*

*a data read for movement in operative relation to the disk within the clean room;*

*a stator mounted on said base plate;*

*a hub supporting said data storage disk, said hub having affixed to an inner surface thereof a magnetic element positioned to surround said stator for magnetically interacting therewith to rotate said hub, said hub having a radially external edge; and*

*a bearing arrangement rotatably supporting said hub on said base plate exclusively in the region of the radially external edge of the hub, said bearing arrangement including a plurality of bearing elements and a cage device affixed to said hub for separating said bearing elements, said cage device further arranged to provide a sealing action between said hub and said base plate.*

*21. A disk storage device comprising:*

*a clean room defined in part by a base plate;*

*at least one data storage disk;*

*a data read head mounted on the base plate for movement in operative relation to the disk within the clean room;*

*a stator mounted on said base plate;*

*a hub supporting said data storage disk, said hub having affixed to an inner surface thereof a magnetic element positioned to surround said stator for magnetically interacting therewith to rotate said hub, said hub having a radially external edge;*

*a bearing arrangement rotatably supporting said hub on said base plate exclusively in the region of the radially external edge of the hub; and*

*a ventilation arrangement including an inlet opening in said base plate adjacent said stator and an outlet opening in said base plate outside the periphery of said hub, whereby rotation of said hub draws air into said inlet opening and ejects air through said outlet opening so that contaminants from said motor are removed by the flow of air through said outlet opening.*

*22. The drive motor of claim 21, further comprising an air filter mounted in said inlet opening.*

*23. A disk storage device comprising:*

*a clean room;*

*at least one data storage disk;*

*a data head for movement in operative relation to the disk within the clean room;*

*a rotatable disk mounting element forming a hub for supporting said storage disk in said clean room, said disk mounting element having a radially external edge;*

*a permanent magnetic ring affixed to said rotatable disk mounting element, said ring having an outer diameter of a first dimension;*

*a stator positioned within said permanent magnetic ring and separated therefrom by a substantially cylindrical air gap, said stator producing magnetic flux interacting with said permanent magnetic ring to rotate said rotatable disk mounting element and said data storage disk;*

*a base plate defining a portion of the clean room, said base plate including a bearing support element defining a circular bearing path having a diameter greater than said first dimension; and*

*bearing means engaging said bearing support element and said rotatable disk mounting element for rotatably supporting the disk mounting element in the region of the radially external edge against axial and radial movement on said base plate.*

*24. A disk storage device comprising:*

*a clean room defined in part by a base plate;*

*at least one hard storage disk;*

*a data read for movement in operative relation to the disk within the clean room;*

*a stator;*

*a cylindrical rotor member having an outer diameter of first dimension;*

*a coaxial hub having a radially external edge, to the outer surface of which said hard disk is secured; and*

*a bearing arrangement mounted on said base plate including bearing elements rotatably supporting said coaxial hub in the region of the radially external edge against axial and radial movement, said bearing elements being restrained to follow a circular bearing path having a diameter greater than said first dimension.*

*25. A disk storage device comprising:*

*a clean room defined in part by a base plate;*

*at least one data storage disk;*

*a data read head for movement in operative relation to the disk within the clean room;*

*a rotatable disk mounting element forming a hub for supporting said storage disk in said clean room, said disk mounting element having a radially external edge;*

*a cylindrical bearing support member mounted on said base plate;*

*at least one bearing mounted on the outer surface of said bearing support member and engaging said disk mounting element to support the disk mounting element in the region of the radially external edge for rotation against axial and radial movement in the clean room; and*

*a motor coupled to said disk mounting element for rotating said disk mounting element and said storage disk, said motor including stator and magnetic rotor elements mounted within said bearing support member.*

*26. A disk storage device comprising:*

*a clean room defined in part by a base plate;*

*at least one data storage disk;*

*a data read for movement in operative relation to the disk within the clean room;*

*a rotatable disk mounting element forming a hub for supporting said storage disk in said clean room, said disk mounting element having a radially external edge;*

*a cylindrical bearing support member affixed to said rotatable disk mounting element;*

*at least one bearing mounted on the outer surface of said bearing support member and engaging said base plate for supporting said disk mounting element in the region of the radially external edge for rotation against axial and radial movement in the clean room; and*

*a motor coupled to said disk mounting element for rotating said disk mounting element and said storage disk, said motor including stator and magnetic rotor elements mounted within said bearing support member.*

*27. A disk storage device comprising:*

*a clean room defined in part by a base plate;*

*at least one data storage disk;*

*a data read for movement in operative relation to the disk within the clean room;*

*a stator mounted on said base plate;*

*a hub supporting said data storage disk, said hub having affixed to an inner surface thereof a magnetic element positioned to surround said stator for magnetically interacting therewith to rotate said hub, said hub having a radially external edge; and*

*a bearing arrangement rotatably supporting said hub in the region of the radially external edge against axial and radial movement on said base plate, said bearing arrangement including a plurality of bearing elements*

*and a cage device affixed to said hub for separating said bearing elements, said cage device further arranged to provide a sealing action between said hub and said base plate.*

*28. A disk storage device comprising:*

*a clean room defined in part by a base plate;*

*at least one data storage disk;*

*a data read head mounted on the base plate for movement in operative relation to the disk within the clean room;*

*a stator mounted on said base plate;*

*a hub supporting said data storage disk, said hub having affixed to an inner surface thereof a magnetic element positioned to surround said stator for magnetically interacting therewith to rotate said hub, said hub having a radially external edge;*

*a bearing arrangement rotatably supporting said hub in the region of the radially external edge against axial and radial movement on said base plate; and*

*a ventilation arrangement including an inlet opening in said base plate adjacent said stator and an outlet opening in said base plate outside the periphery of said hub, whereby rotation of said hub draws air into said inlet opening and ejects air through said outlet opening so that contaminants from said motor are removed by the flow of air through said outlet opening.*

*29. The drive motor of claim 28, further comprising an air filter mounted in said inlet opening.*

*30. A disk storage device comprising:*

*a clean room defined in part by a base plate;*

*one or more hard data storage disks;*

*a data read head mounted on the base plate for movement in operative relation to the disk within the clean room;*

*a stator;*

*a rotor;*

*a bearing arrangement and a coaxial hub having a radially external edge, to the outer surface of which the one or more hard disks are secured, characterized in that the bearing arrangement comprises a bearing disposed in the region of the radially external edge of the hub which rotatably supports the hub against axial and radial movement.*

* * * * *

UNITED STATES PATENT AND TRADEMARK OFFICE

CERTIFICATE OF CORRECTION

PATENT NO. : RE 37,455 E
DATED : November 27, 2001
INVENTOR(S) : Müller et al.

It is certified that error appears in the above-identified patent and that said Letters Patent is hereby corrected as shown below:

Column 6,
Line 57, "read for" should read -- read head for --.

Column 7,
Line 34, "data head" should read -- data read head --.
Line 59, "read for" should read -- read head for --.

Column 8,
Line 33, "read for" should read -- read head for --.
Line 52, "read for" should read -- read head for --.

Signed and Sealed this

Fourteenth Day of May, 2002

*Attest:*

*Attesting Officer*

JAMES E. ROGAN
*Director of the United States Patent and Trademark Office*